G. H. LEWIS.
CLEANING APPARATUS.
APPLICATION FILED JULY 9, 1918.

1,288,064.

Patented Dec. 17, 1918.
2 SHEETS—SHEET 1.

INVENTOR.
George H. Lewis.
BY Chapin + Neal
ATTORNEYS.

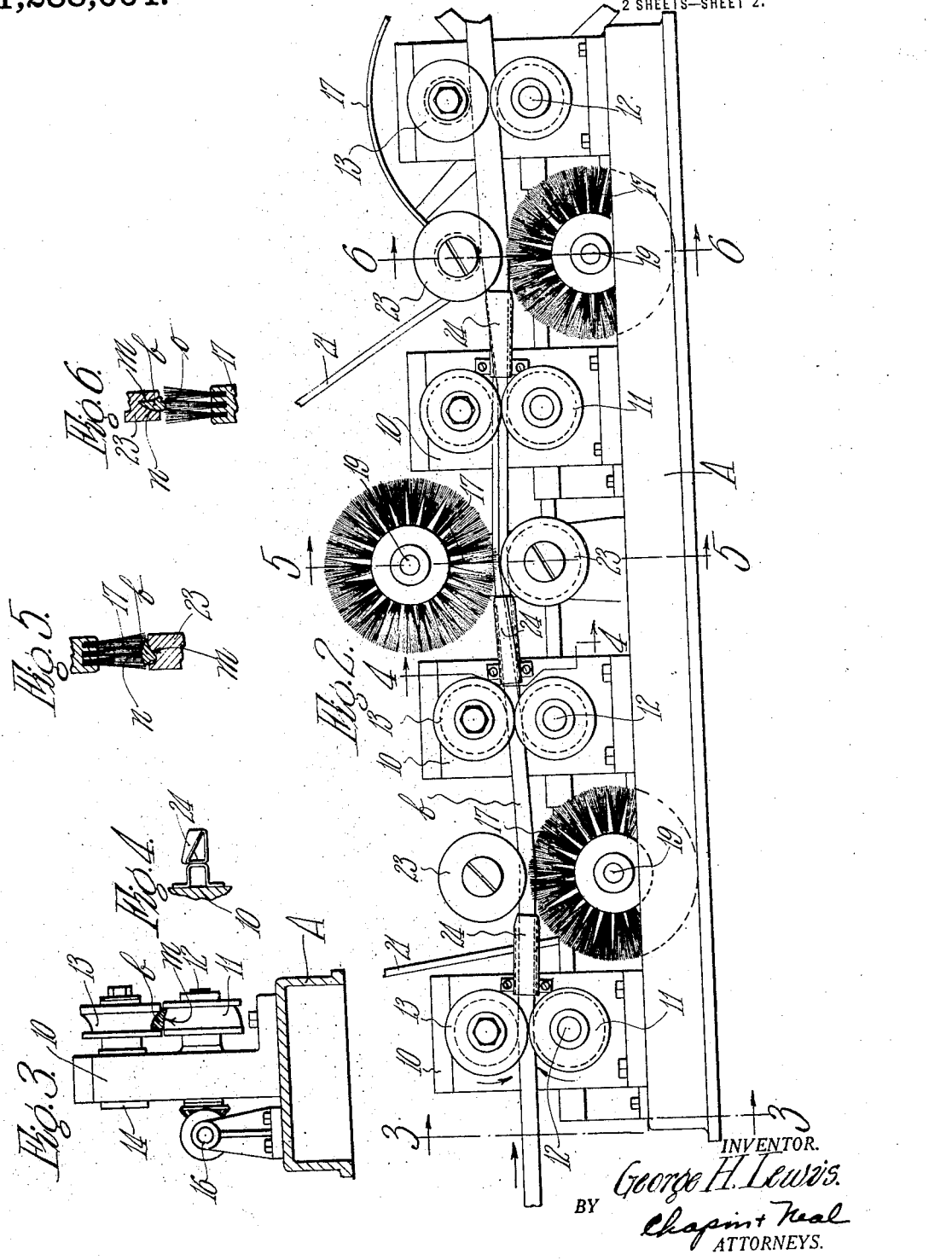

UNITED STATES PATENT OFFICE.

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

CLEANING APPARATUS.

1,288,064.

Specification of Letters Patent. Patented Dec. 17, 1918.

Application filed July 9, 1918. Serial No. 244,009.

*To all whom it may concern:*

Be it known that I, GEORGE H. LEWIS, a citizen of the United States, residing at Chicopee Falls, in the county of Hampden and State of Massachusetts, have invented certain new and useful Improvements in Cleaning Apparatus, of which the following is a specification.

This invention relates to cleaning or polishing apparatus and more particularly to improvements in such apparatus to adapt it for effective operation on continuous strips of material having a multi-sided and more or less irregular cross-sectional shape.

While the invention is capable of general application, it is particularly designed for, and is especially advantageous as, an automatic cleaning or polishing apparatus for the bead strips used in tire shoes. Such bead strips, although of generally triangular shape, usually have one or more curved surfaces and are of a more or less irregular cross-sectional shape. There are concavities, convexities, grooves, and indentations, which are difficult to reach and effectively clean and polish in ordinary types of apparatus.

This invention, therefore, has for its object to provide an improved cleaning or polishing apparatus in which strips of material, such as those employed for tire beads, for example, may be treated, as will more particularly appear in the following description and in the appended claims.

The invention, in an embodiment at present preferred, is shown for illustrative purposes in the accompanying drawings, in which:

Fig. 2 is a front elevational view thereof;

Fig. 3 is a cross-sectional view taken on the line 3—3 of Fig. 2; and

Figure 1:
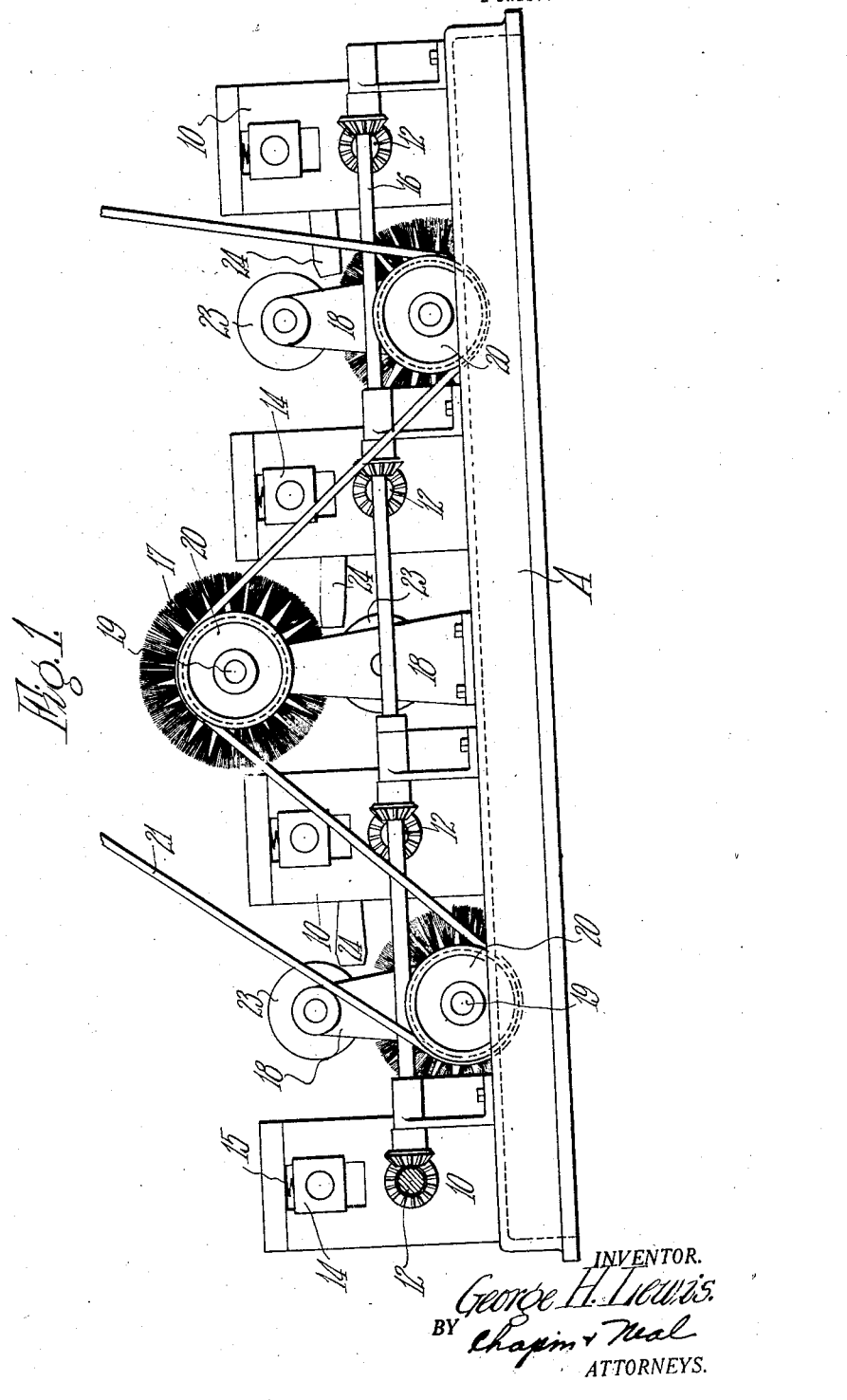
Figure 1 is a rear elevational view of a machine embodying the invention.

Figs. 4, 5, and 6 are fragmentary cross-sectional views taken on the lines 4—4, 5—5, and 6—6, respectively, of Fig. 2.

Referring to these drawings, A represents the main frame or bed plate of the machine and mounted thereon in longitudinally spaced relation are a plurality of upstanding brackets 10. Each of the latter revolubly supports a pair of coacting feeding or driving rolls which are revoluble in opposite directions and preferably adjustable toward and away from one another. Thus, as shown in the drawings, the lower roll 11 of each pair is fixed on a shaft 12, which is mounted in a fixed bearing in its bracket 10 while the upper roll 13 is revolubly supported by a movable bearing 14 (Fig. 1) which is slidable toward and away from roll 11. The bearings 14 may be adjusted in the brackets 10 by any suitable means and may, for example, be yieldingly urged toward the rolls 11 by suitable springs 15. As shown in Fig. 1, the several shafts 12 are interconnected by bevel gear connections with a common shaft 16, and one of the shafts 12 may be driven from a suitable source of power by the pulley 17 (Fig. 2). Thus, the several feed rolls 11 may be positively driven, and the driving connections are such that the rolls rotate at equal speed.

The driving means described are particularly designed for propelling materials of a plastic or semi-plastic nature, which are not capable of withstanding tensile strains to any considerable degree. The driving means obviously is capable of handling other materials and is, therefore, not restricted to the use mentioned although it is particularly suitable therefor.

As an illustrative example, the machine will be described with reference to its use in handling and treating strips of rubber, such as are used for the beads of tire shoes. These beads may be supplied in continuous strip form and fed into the bight of the several pairs of rolls 11 and 13 and thereby carried in a substantially straight line path.

These bead strips, such as shown at *b* in the drawings, are generally of rather irregular cross-sectional shape and, although usually they are substantially triangular in shape, they are not truly so. Thus, with the bead *b* illustrated, none of its sides are flat surfaces but, on the contrary, are rounded. One face of the bead shown has a convex and another a concave curvature, and the third has a narrow groove therein. Various other shapes of beads are used, and the description of the one illustrated is merely for the purpose of showing that beads as a general class, by reason of their irregular surfaces, are not capable of being effectively brushed, buffed, or polished by the ordinary machines.

The means for operating upon the bead strip *b* are disposed one between each successive pair of feed rolls. Such means consist of rotary brushing devices 17, which may be used to buff and polish the bead strip $b$ or to clean it by removing particles of rubber, fins, foreign material, and the like, or to roughen the bead prior to the application of cement or for other similar purposes. Each brush 17 is rotatably journaled in a bracket 18, and each of the latter is secured to bed A intermediate a pair of the brackets 10. Each brush 17 is carried by a shaft 19 and is disposed substantially in a common vertical plane with the feed rolls 11. Each shaft 19, as shown in Fig. 1, carries a pulley 20, and the several pulleys 20 are connected by a belt 21, by means of which the several brushes may be rotated. Associated with each brush 17 is an idler roll 23, which is suitably grooved to receive and guide the bead strip $b$ and is mounted in bracket 18 so as to engage that portion of the bead $b$ opposite from that engaged by its associated brush 17. Thus, the bead is held against deflection away from the brushes and preferably the rolls 23 are so arranged as to vertically deflect the bead slightly out of its straight line path between the pairs of feed rolls for the purpose of providing an additional area of frictional engagement between the bead and feed rolls.

It is to be noted that the several brushes 17 are mounted with their axes in parallel relation so that they are effective to engage and efficiently brush only such surfaces of the bead as lie substantially in a plane parallel with their axes. To insure an efficient brushing of each of the irregular faces of the bead strip $b$, means are provided, between each pair of feed rolls and the adjacent brush, to twist or turn the bead so that one face of the bead strip will be positioned substantially tangential to, and substantially parallel with, the axis of a brush. The turning means consists of guiding tubes 24 through which the bead strip $b$ is passed as it leaves the feed rolls. The tubes 24 are supported from the brackets 10, preferably in a manner to permit convenient removal, as indicated.

Each of the several rolls 11, 13, and 23 are specially grooved to conform to the contour of the bead $b$ whereby the rolls may engage the bead without injury thereto or alteration of the shape thereof. It follows that each of the several rolls will require to be differently shaped inasmuch as different portions of the bead are engaged by successive rolls during the travel of the bead. Likewise, each guiding tube 24 will be differently shaped from the preceding one, and each tube 24 is so shaped as to impart a gradual turning or twisting of the bead.

The operation of the machine will now be described. Assuming that the strip $b$ has been threaded through the machine and that power is applied to the feed rolls and brushes, the strip traveling in the direction of the arrow shown in Fig. 2, will be successively engaged by each brush 17 and, prior to such engagement, will also be twisted so that a substantially flat engagement between the bead and brush will be obtained. Thus, as the strip $b$ leaves the first feed roll 10, its face $m$ (Fig. 3) already lies substantially in the proper position for engagement by the first brush 17, and the first tube 24 need, at most, impart only a slight twist in the bead and has, therefore, chiefly a guiding function. From the exit of the first tube 24 to the second feed roll 10, the bead strip $b$ is held from twisting by the first roll 23 and by the second pair of feed rolls. As the strip leaves the latter, it is twisted by the second tube 24 (the cross-sectional shape of which is shown in Fig. 4) to bring the face $n$ of the bead into position for engagement by the second brush 17, as indicated in Fig. 5, and subsequently the third tube 24 again twists the bead until the third face $o$ is positioned for engagement with the third brush 17 (Fig. 6). Thus, each face of the bead strip is successively presented to a brush and in such a manner as to insure that each of the irregular faces of the strip receives a thorough and effective brushing.

The means for twisting the bead strip during its travel is important for the reasons outlined, and it is also advantageous since the several brushes can be mounted in fixed positions and with their axes in parallel relation so that the several brushes may be conveniently and simply driven. The gradual twisting of the bead also assists in loosening foreign material on the strip, such as soapstone, talc, and the like. Moreover, the successive twists imparted and the successive vertical deflections by reason of rolls 23, tend to straighten out the bead strip so that, when the latter emerges from the machine, it is free not only from foreign substances but also from undesirable kinks and bends.

It is also to be noted that a plurality of pairs of feed rolls are provided. Instead of relying upon one feeding means, which, by drawing the bead strip through the several twisting rolls and brushes, might well cause an elongation of the strip, a feeding means is applied on each side of each group, comprising a brush 17, rolls 23, and tube 24. Thus, one pair of feed rolls pushes on the strip adjacent tube 24 while the next pair of feed rolls is exerting an equal pull on the strip, so that the possibility of elongation of the strip is reduced to a minimum.

Thus, I have provided an apparatus in which material in strip form and of somewhat irregular cross-section, such as tire beads and the like, may be effectively operated upon by rotary brushing means, for cleaning, polishing, buffing, and analogous purposes.

The invention has been disclosed herein, in an embodiment at present preferred, for illustrative purposes, but the scope of the invention is defined by the appended claims rather than by the foregoing description.

What I claim is—

1. In a machine for cleaning the exterior surfaces of strips of irregular cross sectional shape, feeding and guiding means operable to continuously feed strips of indefinite length in a substantially straight line path, a plurality of rotary cleaning devices to successively engage the strip at longitudinally spaced points in its travel, and chute-like members through which the strip is arranged to pass, said members being mounted at longitudinally spaced points and twisted transversely to twist the strip about its longitudinal axis, so that each face of the strip is successively presented to one of said devices.

2. In an apparatus of the class described, feeding and guiding means to move a multi-sided strip of material in a predetermined path, a plurality of rotary brushing devices engageable with the strip at spaced points in its travel, the axes of all said devices being disposed in parallel relation, and means to twist the strip during its travel so that each side is successively positioned for engagement by one of said devices.

3. In an apparatus of the type described, a plurality of spaced driving devices to carry a multi-sided strip of material of indefinite length in a predetermined path, a rotary brushing device between adjacent driving devices, and means engageable with the strip at spaced points in its travel to twist the strip so that each face is successively positioned for substantially flat engagement with a brush.

4. In a machine of the class described, a plurality of longitudinally spaced pairs of coacting feed rolls, the axes of which are arranged in parallel relation, driving mechanism to couple at least one roll of each pair and positively drive the coupled rolls in synchronism, a plurality of rotary brushes mounted to engage the fed strip at longitudinally spaced points in its travel and mounted one between each pair of adjacent sets of feed rolls, and a stationary chute between adjacent brushes and having a transversely twisted passage through which the strip is arranged to pass and by which the strip is twisted about its longitudinal axis.

GEORGE H. LEWIS.